US009156425B1

(12) United States Patent  
Solomon et al.

(10) Patent No.: US 9,156,425 B1  
(45) Date of Patent: Oct. 13, 2015

(54) METHODS AND APPARATUS FOR RESTRAINING VEHICULAR PASSENGERS

(71) Applicant: Honda Motor Co., Ltd., Tokyo (JP)

(72) Inventors: Andrew Solomon, Plain City, OH (US); Eric Heitkamp, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/467,892

(22) Filed: Aug. 25, 2014

(51) Int. Cl.
| B60R 21/16 | (2006.01) |
| B60R 21/206 | (2011.01) |
| B60R 21/237 | (2006.01) |
| B60R 21/2338 | (2011.01) |
| B60R 21/26 | (2011.01) |
| B60R 21/33 | (2006.01) |
| B60R 21/231 | (2011.01) |

(52) U.S. Cl.
CPC ............. B60R 21/206 (2013.01); B60R 21/237 (2013.01); B60R 21/2338 (2013.01); B60R 21/26 (2013.01); B60R 21/33 (2013.01); *B60R 2021/23169* (2013.01)

(58) Field of Classification Search
USPC ............. 280/728.1, 728.2, 728.3, 730.1, 732, 280/743.1, 743.2
See application file for complete search history.

(56) References Cited

U.S. PATENT DOCUMENTS

| 5,178,407 | A | * | 1/1993 | Kelley | 280/728.1 |
| 5,240,282 | A | * | 8/1993 | Wehner et al. | 280/728.1 |
| 5,275,435 | A | | 1/1994 | Fischer | |
| 5,492,367 | A | * | 2/1996 | Albright et al. | 280/743.1 |
| 5,538,281 | A | * | 7/1996 | Patercsak | 280/743.1 |
| 5,542,698 | A | * | 8/1996 | Ichino et al. | 280/732 |
| 5,570,901 | A | * | 11/1996 | Fyrainer | 280/730.1 |
| 5,613,348 | A | | 3/1997 | Lunt et al. | |
| 6,176,509 | B1 | | 1/2001 | Kawaguchi et al. | |
| 6,186,544 | B1 | * | 2/2001 | Igawa | 280/743.1 |
| 6,217,059 | B1 | * | 4/2001 | Brown et al. | 280/730.2 |
| 6,631,923 | B2 | | 10/2003 | Eckert et al. | |
| 6,739,622 | B2 | | 5/2004 | Halford et al. | |
| 6,752,417 | B2 | | 6/2004 | Takimoto et al. | |
| 6,945,557 | B2 | | 9/2005 | Takimoto et al. | |
| 7,182,365 | B2 | | 2/2007 | Takimoto et al. | |
| 7,232,149 | B2 | | 6/2007 | Hotta et al. | |
| 7,370,881 | B2 | | 5/2008 | Takimoto et al. | |

(Continued)

FOREIGN PATENT DOCUMENTS

| JP | 2004-352012 A | 12/2004 |
| JP | 2005-096576 A | 4/2005 |
| JP | 2006-206049 A | 8/2006 |

*Primary Examiner* — Toan To (74) *Attorney, Agent, or Firm* — Kenealy Vaidya LLP (57) ABSTRACT

An airbag can include a first portion disposed closest to the passenger seat upon deployment, and configured to be rolled to form a cylindrical configuration having an axis that is perpendicular to a vehicle's longitudinal axis. The first portion can include a serpentine section disposed closest the vehicle's longitudinal axis and configured to be folded in a serpentine manner along the cylindrical configuration's axis. The first portion can include a rolled section that is spaced further from the longitudinal axis of the vehicle than the serpentine section. The airbag can include a second portion disposed closer to the instrument panel than the first portion and including a tether that is rigidly connected to the vehicle. The second portion can be disposed further from the longitudinal axis of the vehicle than the serpentine section, but at approximately the same distance from the longitudinal axis of the vehicle as the rolled section.

20 Claims, 9 Drawing Sheets

(56) References Cited

U.S. PATENT DOCUMENTS

| | | |
|---|---|---|
| 7,396,042 B2 | 7/2008 | Mabuchi et al. |
| 7,735,862 B2 | 6/2010 | Choi |
| 7,793,975 B2 | 9/2010 | Fukawatase et al. |
| 7,819,420 B2 | 10/2010 | Adachi et al. |
| 7,845,682 B2 * | 12/2010 | Lachat et al. ............ 280/743.1 |
| 7,878,540 B2 | 2/2011 | Takimoto et al. |
| 7,926,844 B2 | 4/2011 | Williams et al. |
| 7,963,550 B2 | 6/2011 | Hong et al. |
| 8,096,578 B2 | 1/2012 | Wigger et al. |
| 8,220,830 B2 | 7/2012 | Takimoto et al. |
| 8,302,991 B2 | 11/2012 | Hong et al. |
| 8,328,229 B2 | 12/2012 | Wigger et al. |
| 8,337,377 B2 | 12/2012 | Buchholz et al. |
| 8,407,968 B2 | 4/2013 | Lachat et al. |
| 8,540,276 B2 | 9/2013 | Schneider et al. |
| 8,540,278 B2 | 9/2013 | Chavez et al. |
| 8,608,200 B2 * | 12/2013 | Miyata ................ 280/743.1 |
| 8,622,418 B2 | 1/2014 | Chun et al. |
| 8,678,430 B2 | 3/2014 | Motomochi et al. |
| 9,010,804 B2 * | 4/2015 | Witt et al. ............. 280/743.2 |

* cited by examiner

METHODS AND APPARATUS FOR RESTRAINING VEHICULAR PASSENGERS

BACKGROUND

The disclosed subject matter relates to methods and apparatus for restraining vehicular passengers. More particularly, the disclosed subject matter relates to vehicular airbags and airbag systems, methods of folding and otherwise installing vehicular airbags, methods of inflating vehicular airbags, and methods of manufacturing vehicular airbags and airbag systems.

Vehicles can be provided with various systems and apparatus for restraining vehicular passengers, such as in the event of a collision. For example, some related art vehicles are provided with airbags that inflate if forces are sensed or otherwise detected that indicate a collision or other event that may transmit potentially harmful forces to a vehicular passenger. Under these conditions, the airbag is rapidly inflated for the purpose of restraining the vehicular passenger to prevent or reduce injuries, such as by providing a buffer between the passenger and other objects, e.g., portions of the vehicle's interior. As one example, in the event of a vehicular front collision, the airbag is configured and oriented to deploy between the passenger and a portion of the vehicular interior immediately in front of the passenger. The forces resulting from the collision cause the passenger to move forward and contact the airbag instead of portions of the vehicular interior that would otherwise be contacted, thereby reducing, mitigating or preventing passenger injuries.

SUMMARY

The configuration, size, shape, installation location and orientation, etc., of the airbag can be varied depending on the type of vehicle, application, etc., to enhance passenger outcomes. As one example, front lower facing airbags, such as airbags that are designed to protect a vehicular passenger's knees and adjacent portions of the legs, can be configured for installation in steering columns or lower portions of an instrument panel. During installation, the airbags can be rolled, folded, or both, and retained in a rolled or folded state behind a housing cover. During a collision, vehicular sensors trigger activation of an inflator, which can rapidly fill the airbag with an inflation gas. The airbag then rapidly changes from a rolled or folded configuration to a deployed, inflated configuration and thereby restrains the occupant and provides a buffer between the passenger and a portion of the vehicle's interior that the passenger would otherwise impact. In the case of the above front lower facing airbag, a buffer is provided between the vehicular passenger's knees (and adjacent portions of the legs) and the relevant portion of the vehicle's interior.

In order to provide enhanced outcomes, airbags can also be configured and disposed in certain locations and orientations based on anticipated passenger sizes, positions, etc., which are determined in part by the vehicular seat location(s). However, during a collision, all or a portion of the passenger's body may be disposed at an unanticipated location or other location that does not enable the airbag to provide a proper buffer, such as where a passenger is positioned adjacent the seating area or otherwise beyond reach of the airbag. In fact, passenger injuries may be caused or exacerbated by airbags under these circumstances.

It may therefore be beneficial to provide methods and apparatus that address at least one of the above and/or other disadvantages. In particular, it may be beneficial to provide airbags and airbag systems, as well as methods of orienting and positioning airbags, to enhance passenger outcomes in circumstances where all or a portion of the passenger's body is positioned adjacent or otherwise spaced from the passenger's seating area. For example, it may be beneficial to configure and fold an airbag in a manner that affects the airbag's deployment trajectory and behavior to thereby enhance the coverage of protection provided thereby.

Some embodiments are therefore directed to an airbag for use with an inflator that is configured to fill the airbag with fluid, the airbag also being for use with a vehicle that includes a passenger seat, an instrument panel, and a longitudinal axis. The airbag can include a first portion disposed closest to the passenger seat upon deployment, and configured to be rolled to form a cylindrical configuration having an axis that is perpendicular to the longitudinal axis of the vehicle. The first portion can include a serpentine section that is disposed closest the longitudinal axis of the vehicle, and configured to be folded in a serpentine manner along the axis of the cylindrical configuration. The first portion can also include a rolled section that is spaced further from the longitudinal axis of the vehicle than the serpentine section. The airbag can also include a second portion disposed closer to the instrument panel than the first portion. The second portion can include a tether that is rigidly connected to the vehicle. The second portion can be disposed further from the longitudinal axis of the vehicle than the serpentine section, but also disposed at approximately the same distance from the longitudinal axis of the vehicle as the rolled section.

Some other embodiments are directed to an airbag assembly for use with a vehicle that includes a passenger seat, an instrument panel, and a longitudinal axis. The airbag assembly can include an airbag having a first portion disposed closest to the passenger seat upon deployment and configured to be rolled to form a cylindrical configuration having an axis that is perpendicular to the longitudinal axis of the vehicle. The first portion can include a serpentine section that is disposed closest the longitudinal axis of the vehicle and configured to be folded in a serpentine manner along the axis of the cylindrical configuration. The first portion can also include a rolled section that is spaced further from the longitudinal axis of the vehicle than the serpentine section. The airbag can also include a second portion disposed closer to the instrument panel than the first portion. The second portion can include a tether that is rigidly connected to the vehicle. The second portion can be disposed further from the longitudinal axis of the vehicle than the serpentine section, but disposed at approximately the same distance from the longitudinal axis of the vehicle as the rolled section. The airbag assembly can also include an inflator that houses pressurized fluid, and is configured to fill the airbag with the pressurized fluid to deploy the airbag upon collision of the vehicle. The airbag assembly can also include a housing that is configured to house the airbag in a rolled and folded condition while enabling deployment when the airbag is filled with the pressurized fluid.

Yet other embodiments are directed to a method of orienting an airbag for disposition within a housing. The airbag can be configured for use with an inflator that is able to fill the airbag with fluid, and configured for use with a vehicle that includes a passenger seat, an instrument panel, and a longitudinal axis. The method can include: rolling a first portion of the airbag, which is disposed closest to the passenger seat upon deployment, so as to form a cylindrical configuration having an axis that is perpendicular to the longitudinal axis of the vehicle; folding a serpentine section of the first portion, which is disposed closest the longitudinal axis of the vehicle, in a serpentine manner along the axis of the cylindrical configuration; disposing a rolled section of the first portion so as to be spaced further from the longitudinal axis of the vehicle than the serpentine section; disposing a second portion of the airbag so as to be: closer to the instrument panel than the first portion, further from the longitudinal axis of the vehicle than the serpentine section, and at approximately the same distance from the longitudinal axis of the vehicle as the rolled section; and rigidly attaching a tether of the second portion the vehicle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Vehicle and Airbag Housing Structure

Figure 1:
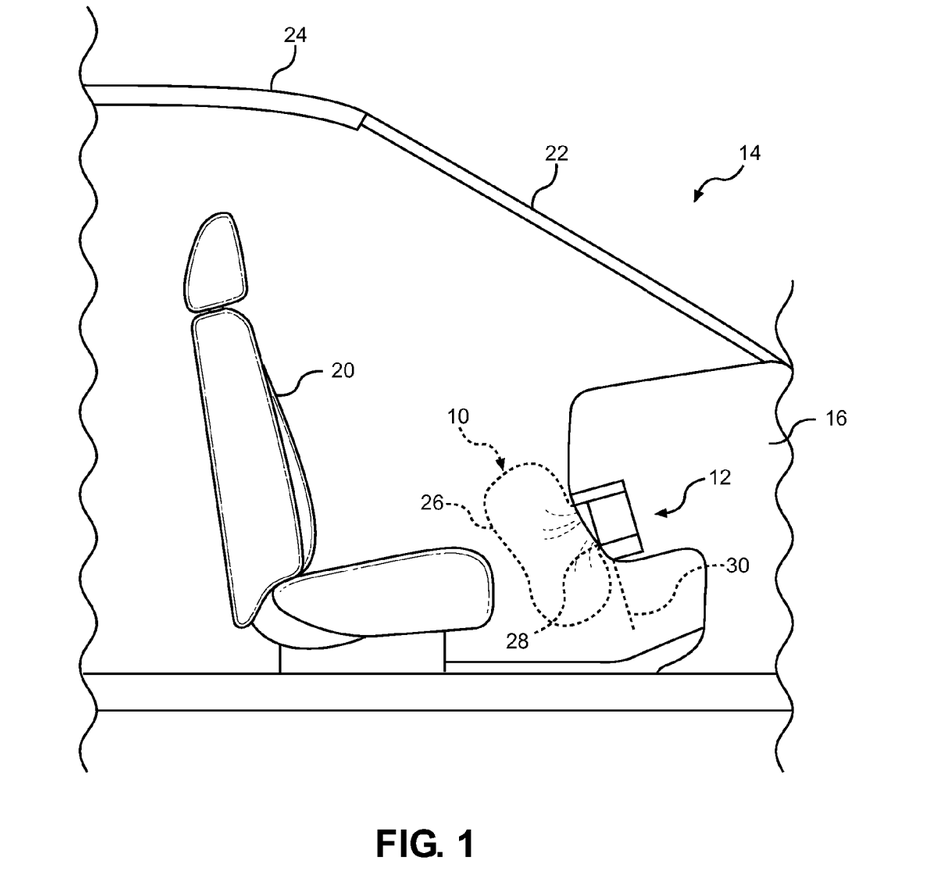
FIG. 1 is a schematic side view of a portion of a vehicle including an exemplary airbag housing assembly and exemplary airbag in accordance with the disclosed subject matter, where the airbag in an inflated condition is shown in phantom.

FIG. 1 is a schematic side view of a portion of a vehicle 14 that can include an airbag housing assembly 12, an instrument panel 16, an occupant seat 20, a vehicle windshield 22, and a vehicle roof 24. The vehicle windshield 22 extends upward and rearward from the instrument panel 16 to the vehicle roof 24.

FIG. 1 illustrates the vehicle as an automobile, and embodiments are intended to include or otherwise cover any type of automobile, including a passenger car, minivan, truck, all-terrain vehicle (ATV), semi-tractor, off-highway vehicle, etc. In fact, embodiments are intended to include or otherwise cover configurations of the airbag housing assembly for use in any other type of vehicle, such as an aircraft, boat, ship, train, spacecraft, etc. Some other embodiments can be used in non-vehicular applications, such as for amusement park rides, playground apparatus, or any other situation where an airbag can enhance outcomes subsequent to transmission of a force.

The exemplary airbag housing assembly 12 can include a housing container 18, an airbag 10, and an inflator (not shown in FIG. 1). In the embodiment shown in FIG. 1, housing container 18 of airbag housing assembly 12 is connected to a lower portion of the instrument panel 16 in a vehicle forward position relative to occupant seat 20.

However, the various embodiments are intended to include or otherwise cover any configuration or mounting of housing container 18, such as but not limited to housing container 18 being configured as part of the instrument panel 16. In other words, the housing container 18 can be integral or unitary with the instrument panel 16. The various embodiments are further intended to include or otherwise cover any position and orientation of airbag housing assembly 12 in a vehicle that may be beneficial, such as the airbag housing assembly 12 being mounted in front of a driver seat or in front of rear seats of a vehicle.

The exemplary airbag 10 can be configured as an inflatable "knee" airbag 10 intended to protect the knee, legs, etc., of an occupant in the event of a vehicular collision. As discussed in more detail below, some embodiments are intended to include airbag housing assembly 12 mountings and airbag 10 fold patterns that enable the airbag to unfold and inflate in an inboard direction toward the vehicle's longitudinal centerline to more fully protect a vehicular passenger's knees, legs, etc. However, the shape of airbag 10 is shown in phantom in a deployed condition in FIG. 1 for illustration purposes only, and the various embodiments are intended to include or otherwise cover any shape and orientation of airbag 10 that may be beneficial.

Airbag housing assembly 12 can be configured to house airbag 10 in housing container 18 when airbag 10 is placed in a folded, pre-deployed condition. Housing container 18 can include a door panel 30 that can be connected to a main body portion of housing container 18. Door panel 30 can be configured to open when the airbag 10 is activated for deployment, such as upon a vehicular collision.

Airbag housing assembly 12 can also include an inflator (not shown in FIG. 1) that can contain an inflation fluid source, such as pressurized inflation fluid or combustible gas. The inflation fluid source is configured to inflate airbag 10 upon deployment. An inflator of the exemplary airbag housing assembly is described more fully below.

Once deployed, the airbag 10 can define a vehicle rearward portion 26 that is closest to an occupant located in occupant seat 20 when the airbag is inflated. Additionally, when deployed, airbag 10 can have a vehicle forward portion 28 that is farthest from the occupant located in occupant seat 20 when airbag 10 is deployed. However, airbag 10 can include any other appropriate configuration for deployment in a vehicle.

Figure 2:
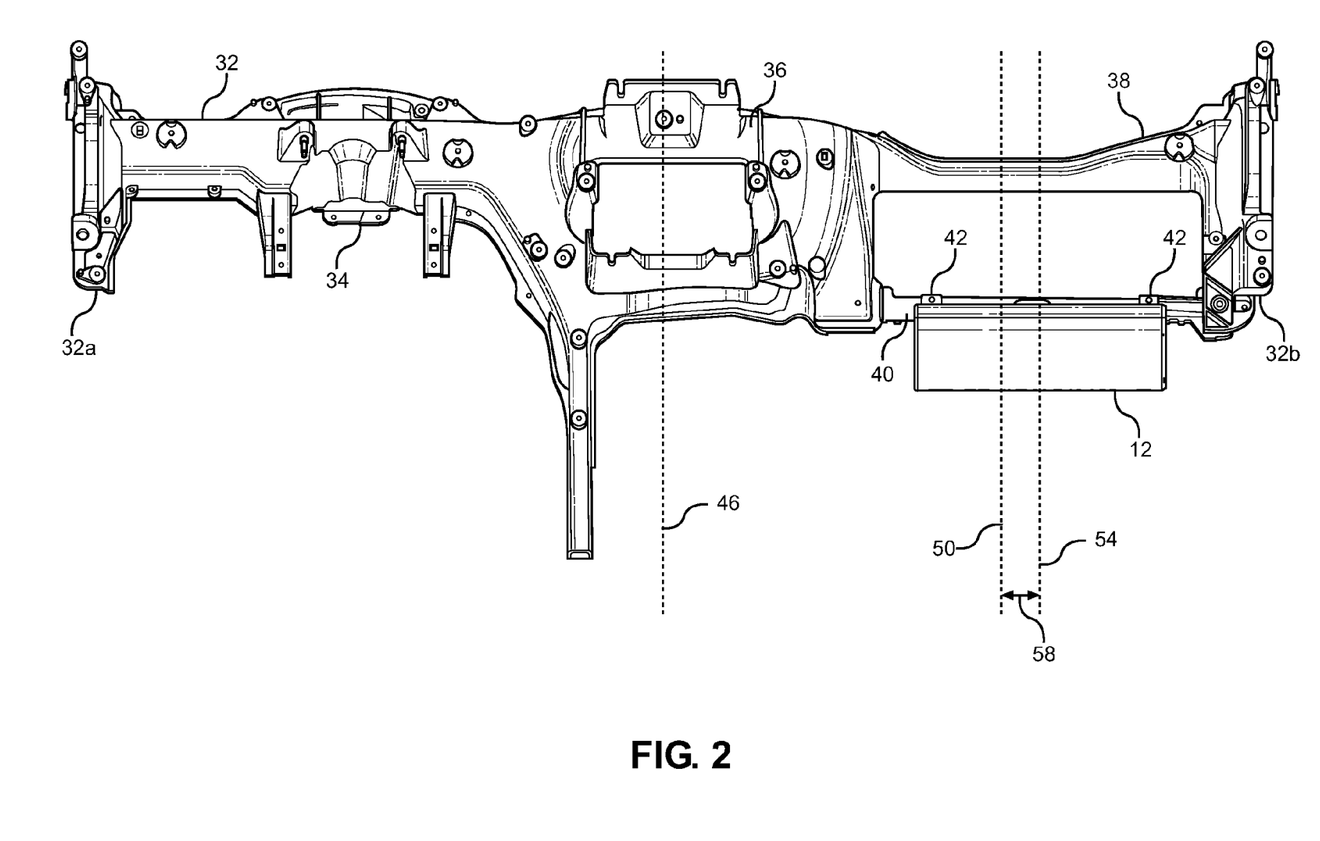
FIG. 2 is a front plan view of a hanger beam assembly for a vehicle including the exemplary airbag housing assembly in accordance with the disclosed subject matter.
Figure 3:
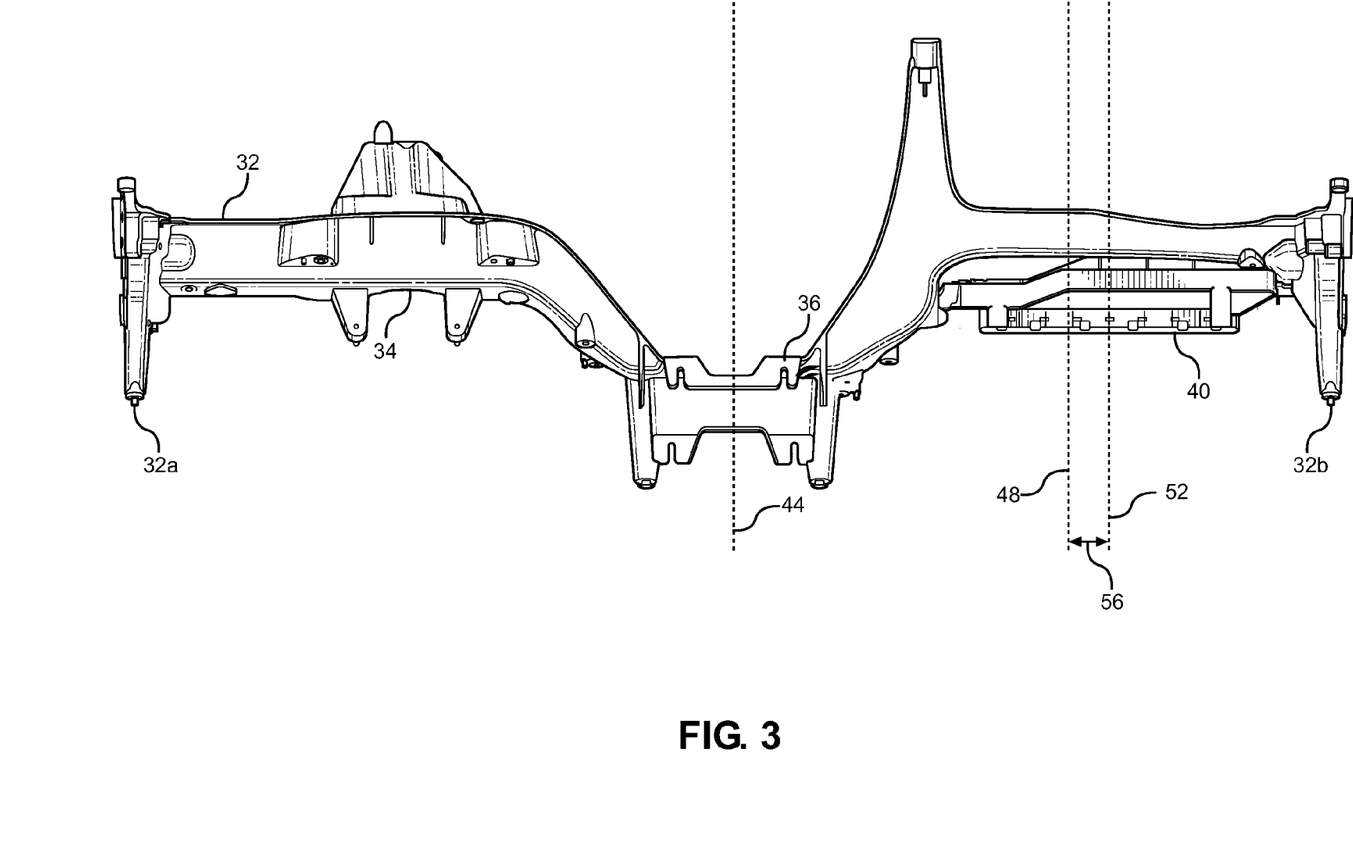
FIG. 3 is a top plan view of the hanger beam assembly of FIG. 2.

FIGS. 2 and 3 illustrate front and top views, respectively, of an exemplary hanger beam assembly 32 for a vehicle 14. Hanger beam assembly 32 can be configured to extend horizontally across a body of vehicle 14 in the vehicle's transverse direction from a first end portion 32a to a second end portion 32b.

Hanger beam assembly 32 can include a steering column support structure 34, a center stack support structure 36, a glove box support structure 38, and an airbag housing assembly support structure 40. Center stack support structure 36 can support various devices, such as navigation systems, infotainment systems, vehicle interior thermostat controls, etc. The airbag housing assembly support structure 40 can include frame members configured to receive airbag housing assembly 12 and thereby housing container 18. Airbag housing assembly 12 and container 18 can be coupled to hanger beam assembly 32 at connection points 42 via fasteners, such as but not limited to welds, bolts, mechanical fasteners, glue, epoxy, etc.

FIGS. 2 and 3 illustrate various centerlines. For example, FIG. 3 shows the vehicular longitudinal centerline 44 that defines a longitudinal center of vehicle 14 in relation to the hanger beam assembly 32. FIG. 2 shows a vehicle vertical centerline 46 that defines a plane containing vehicle's longitudinal centerline 44 in relation to hanger beam assembly 32. Occupant centerline 48 defines a typical occupant's horizontal center in relation to hangar beam assembly 32 and vehicle longitudinal centerline 44 when the occupant occupies seat 20. Occupant vertical centerline 50 defines a plane containing the occupant's centerline 48 as defined by occupant centerline 48 in relation to hanger beam assembly 32.

Airbag housing assembly centerline 52 defines a horizontal center of airbag housing assembly 12 and airbag housing assembly support structure 40 in relation to hanger beam assembly 32 and vehicle longitudinal centerline 44. Airbag housing assembly vertical centerline 54 defines a plane of the airbag housing assembly centerline 52 in relation to hanger beam assembly 32.

The embodiments utilize a non-symmetrical, offset, relationship between housing container 18 for airbag housing assembly 12 and lateral portions of the airbag 10. An offset 56 defines a distance between occupant centerline 48 and airbag housing assembly centerline 52. An offset distance 58 defines a distance between airbag housing assembly vertical centerline 54 and occupant vertical centerline 50. In an exemplary embodiment, airbag housing assembly centerline 52 can be offset 56 at an appropriate distance in an outboard direction, i.e., in a direction away from vehicle center as defined by vertical centerline 46, from occupant centerline 48. In some of the embodiments, airbag 10 is intended to deploy from an advantageous location on hanger beam assembly 32 at a measurable offset 56. However, embodiments are intended to include or otherwise cover any airbag housing assembly position in a vehicle that may be beneficial to deployment of airbag 10.

In an exemplary embodiment, instrument panel 16 is intended to connect directly or indirectly to hanger beam assembly 32. Instrument panel 16 can be configured to include vehicle interior aesthetic surface panels and various devices, such as meters, gauges, indicator lights, storage trays, ventilation covers, etc.

II. Airbag Folding Operations

Figures 4, 5, 6:
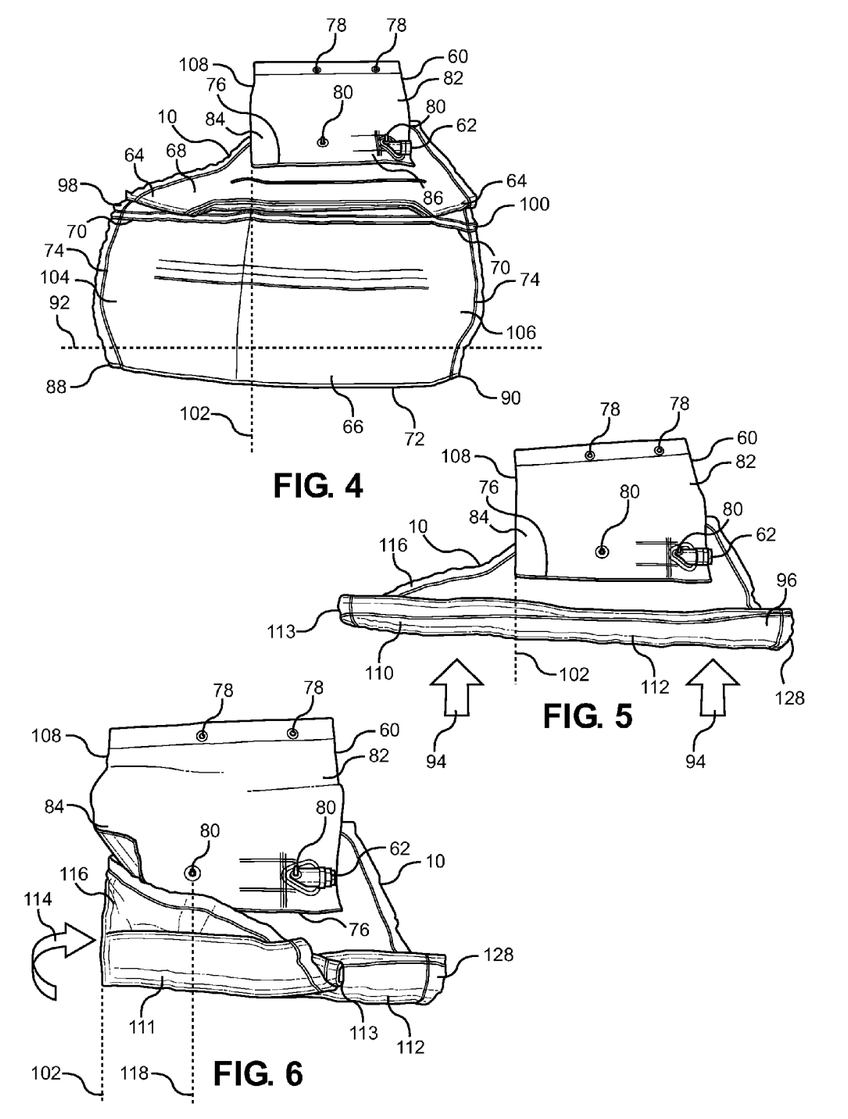
FIG. 4 is a perspective view of the airbag of FIG. 1 in a first configuration where the airbag is laid flat for folding.
FIG. 5 is a perspective view of the airbag of FIG. 4 illustrating a first folding step.
FIG. 6 is a perspective view of the airbag of FIG. 5 illustrating a second folding step.

FIG. 4 is a perspective view of the airbag 10 in a first configuration laid flat for folding. Folds 64 in airbag 10 are shown for illustration purposes only. Airbag 10 can be defined as an inflatable bag formed by a single piece of material that can be folded over onto itself using airbag edge 72 as a fold line. A circumferential seam 74 or other appropriate mechanical fastener can secure edges of the two sides of the folded material together. The two folded sides can form an airtight bag into which inflation gas may be forced to thereby inflate the air bag.

Airbag edge 72 is the folding line where a material for the airbag folds back onto itself. In other embodiments, airbag 10 is configured from multiple panels of material that are connected with seams or other appropriate connection mechanisms.

Airbag 10 can be defined as a first portion 66 and a second portion 68 that are divided by an intermediate seam 70. For purposes of illustration and description of the embodiments, descriptions of airbag 10 surfaces, portions, folds, rolls, etc., are intended to include descriptions for both vehicle forward portion 28 and vehicle rearward portion 26 cooperating together to form airbag 10. In the embodiments, first portion 66 is configured wider in lateral dimensions, as oriented in FIG. 4, than second portion 68. Airbag 10 can further be defined as third portion 104 and fourth portion 106 divided by a fold line 102. In an exemplary embodiment, third portion 104 can have an oblong portion that extends in an asymmetric configuration relative to fourth portion 106. However, embodiments are intended to include or otherwise cover any shape or form of airbag 10 with configurations that may be beneficial to occupant safety and that can be appropriate for the folding methods described herein.

Airbag 10 can include a tether 60 defined as a single piece of non-inflating material that can connect to airbag 10 at tether seam 76 or via other appropriate connection mechanisms. In some embodiments, the tether 60 is attached to airbag 10 at tether seam 76 via stitching, however, other embodiments include or otherwise cover any other or additional manner of attachment. Tether 60 can be further defined as tether attached portion 84, which can attach permanently to airbag 10 at tether seam 76, and tether flap 82 that can be removably attached to airbag 10. Tether 60 secures airbag 10 to housing container 18 or an appropriate structure of vehicle 14 in order to maintain an attachment to housing container 18 during airbag deployment. Tether 60 can include one or more bolt holes 78 configured into tether flap 82, and one or more bolts 80 connected to tether attached portion 84.

As indicated above, the tether 60 is secured to both the airbag 10 and to an appropriate structure of vehicle 14. However, the tether 60 also operates as a bag wrap to maintain the fold during installation into container 18. In addition, the tether 60 maintains the fold during the lifetime of vehicle usage and up until deployment.

Airbag housing assembly 12 can include an inflator 62. In the event that an acceleration of a predetermined value is detected when the vehicle is involved in a collision, the airbag 10 can be inflated with an inflation gas or other appropriate fluid generated by inflator 62. Tether 60 provides a connection point 86 for inflator 62 to connect to airbag 10. Inflator 62 can contain an inflation fluid source that can rapidly inflate airbag 10 upon activation. Inflator 62 can be filled with a combustible material to generate an inflation fluid, such as a pressurized gas, that can inflate airbag 10. In an alternative embodiment, the inflation fluid source can be stored as a quantity of pressurized inflation fluid and an ignitable material for rapidly heating the inflation fluid. Connection point 86 can provide a flow path for inflation fluid discharged from inflator 62. For purposes of the description of the embodiments, it is assumed that a pressurized gas can be released from inflator 62 into airbag 10. However, embodiments are intended to include or otherwise cover any inflation fluid or combustible material that would be appropriate for airbag inflation.

Figure 7:
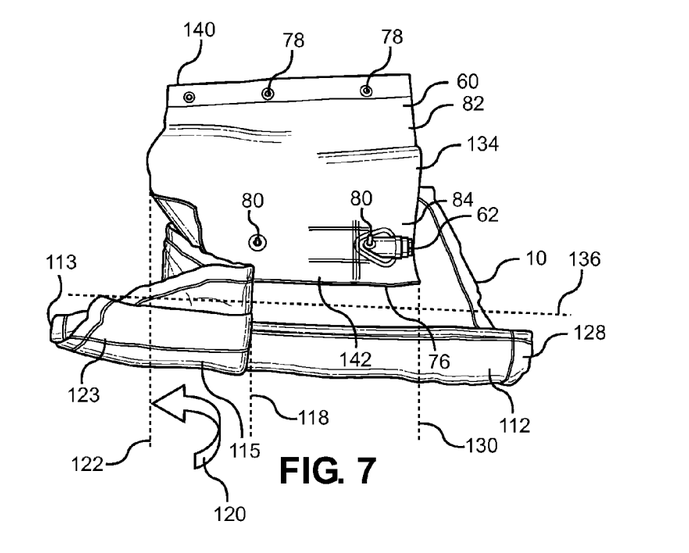
FIG. 7 is a perspective view of the airbag of FIG. 6 illustrating a third folding step.

FIGS. 5-7 are views of airbag 10 in a first configuration that illustrate a series of folding steps of the airbag 10.

Figure 9A:
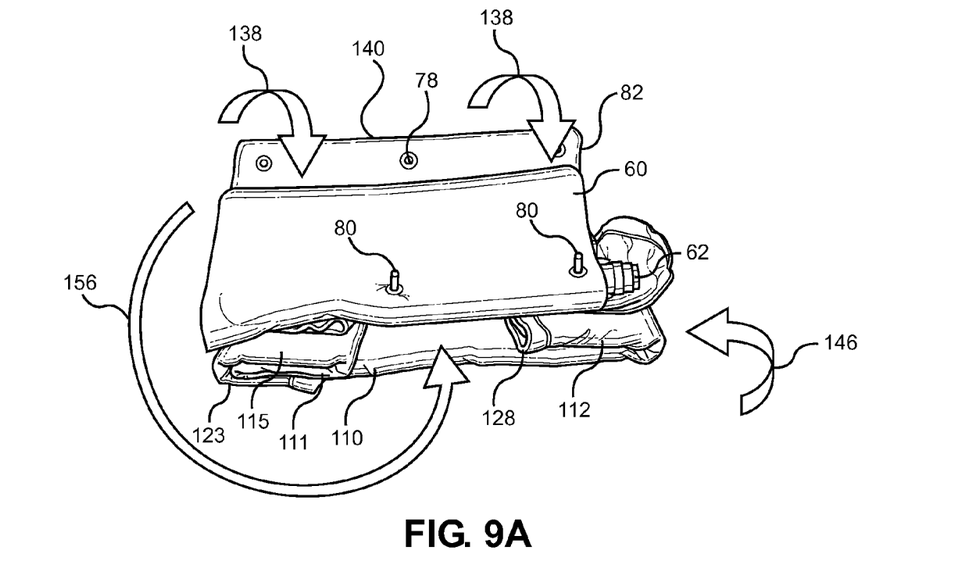
FIG. 9A is a perspective view illustrating fifth and sixth folding steps and the airbag thereby prepared for deployment as viewed in front of the airbag.

Subsequent to airbag 10 being placed into the first configuration shown in FIG. 4, the airbag 10 is manipulated in accordance with a series of folding and rolling steps. The intent of manipulating airbag 10 is to prepare airbag 10 for pre-deployment status in a second configuration shown in FIG. 9. Once airbag 10 has been manipulated into the second configuration in FIG. 9, the airbag 10 can be disposed within housing container 18 for potential deployment.

In a first folding step shown in FIG. 5, a folding process is initiated along airbag edge 72 of first portion 66. The airbag portion 66 is "flat-rolled" beginning from airbag edge 72 towards tether 60. A flat fold is created from corner portion 88 to corner portion 90 along fold line 92 by lifting airbag edge 72 over fold line 92 towards second portion 68. The process is repeated so that airbag 10 can be rolled in this manner a number of times in a direction towards second portion 68 (indicated by direction arrows 94). The folding can be performed with the aid of a paddle (not shown) to help provide rolled sections that are of similar width.

The first folding process can cease when a flat rolled portion 96 between corner portions 88 and 90 encounters a transition to second portion 68. An exemplary transition can be defined as intermediate seam 70, which is positioned between transition corner portion 98 and transition corner portion 100. In the embodiments, flat rolled portion 96 can be configured to have any appropriate dimension. Flat rolled portion 96 should not, however, encounter or overlap tether 60, and should provide a space between tether 60 and flat rolled portion 96. The embodiments are intended to include any appropriate method of folding airbag 10 that would be beneficial to achieving the first folding step. The flat rolled portion 96 is merely illustrated as a schematic, and may include any number of flat folded portions in the first folding process that can be beneficial.

In a second folding step shown in FIG. 6, airbag 10 can be further defined into lateral portions. In the embodiments, third portion 104 and fourth portion 106 are divided by fold line 102. Fold line 102 can approximately align with a tether edge 108 shown in FIGS. 4 and 5. Third portion 104 can define a lateral portion that extends away from fold line 102 at a predetermined distance. Flat rolled portion 96 can be further defined as flat rolled third portion 110, and flat rolled fourth portion 112 that are rolled configurations of third portion 104 and fourth portion 106, respectively. To execute the second folding step, flat rolled third portion 110 is folded along fold line 102 onto flat rolled fourth portion 112 as indicated by direction arrow 114. This folding step result can be defined as a first folded portion 111. Folded edge 113, which includes corner portion 88, overlays flat rolled fourth portion 112.

Because of the contiguous construction of airbag 10, the first folded portion 111 causes a side part of top portion 116 to likewise fold over second portion 68. However, the embodiments are intended to include any appropriate method of folding airbag 10 that would be beneficial to achieving the second folding step.

In a third folding step shown in FIG. 7, first folded portion 111 of flat rolled third portion 110 is folded back upon itself along fold line 118 (see additionally FIG. 6), thereby defining a second folded portion 115 of flat rolled third portion 110. Direction arrow 120 demonstrates the direction of fold for flat rolled third portion 110. The process results in a serpentine configuration of first folded portion 111 and second folded portion 115.

Figure 8:
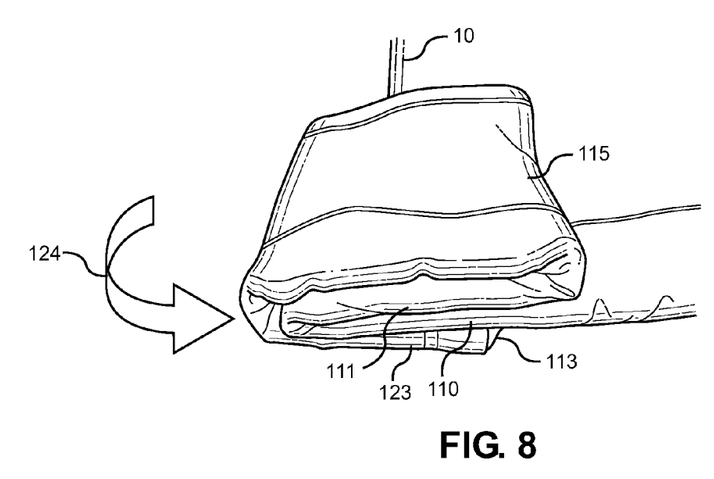
FIG. 8 is an enlarged perspective view of a portion of the airbag of FIG. 7 illustrating a fourth folding step.

In a fourth folding step shown in FIG. 8, the second folded portion 115 can be folded at fold line 122 (see FIG. 7). Direction arrow 124 indicates a direction of the second folded portion 115 folded back towards airbag 10 under flat rolled third portion 110 in a wrapping configuration.

The fourth folding step defines a third folded portion 123 that can be configured under a stack of flat rolled third portion 110, first folded portion 111, and second folded portion 115. However, the embodiments are intended to include any appropriate method of folding airbag 10 that would be beneficial to achieving the fourth folding step.

In a fifth folding step shown in FIG. 9A, flat rolled fourth portion 112 can be folded back onto itself at fold line 130 (see FIG. 7). A folded edge 128 of flat rolled fourth portion 112, which includes corner portion 90, is folded towards airbag 10 in the direction of direction arrow 132. Fold line 130 can be in approximate alignment with a tether edge 134. In an alternative embodiment, fold line 130 can be disposed at any location as appropriate to perform the function of folding flat rolled fourth portion 112 as described above. However, the embodiments are intended to include any appropriate method of folding airbag 10 that would be beneficial to achieving the fifth folding step.

Figure 9B:
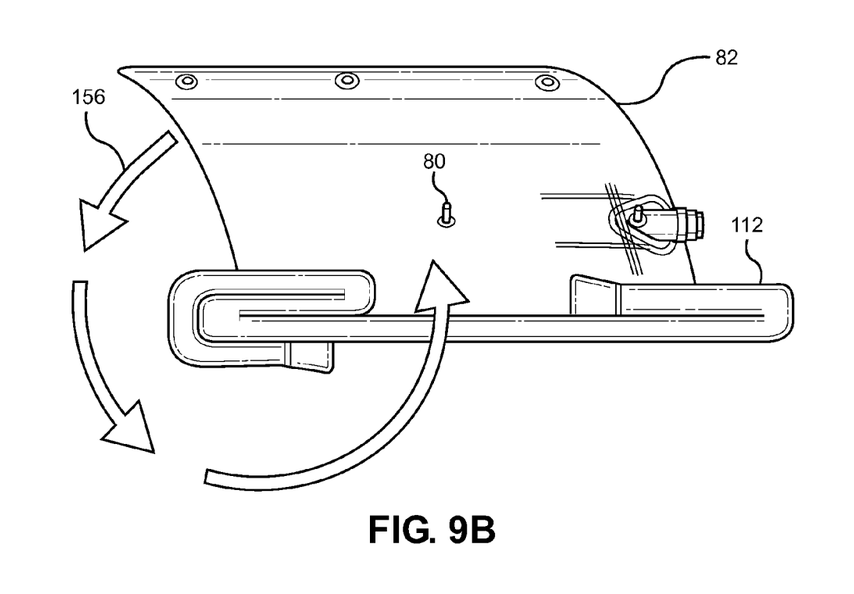
FIG. 9B is a perspective view illustrating the sixth folding step as viewed from a side of the airbag.

In a sixth folding step shown in FIGS. 9A and 9B, tether attached portion 84 is folded back onto second folded portion 115 and flat rolled fourth portion 112 at fold line 136 (See FIG. 7) indicated by direction arrows 138. Tether flap 82 is then folded back around the airbag 10, in a wrapping fashion in the direction of direction arrow 156, so that tether flap 82 can be removably coupled to tether attached portion 84 by connecting one or more bolt holes 78 to one or more bolts 80 as appropriate. However, the embodiments are intended to include any appropriate method of folding airbag 10 that would be beneficial to achieving the sixth folding step.

After completion of the sixth folding step, airbag 10 is placed into the second configuration defining a pre-deployed state. In the pre-deployed state, airbag 10 can be installed in housing container 18 of airbag housing assembly 12. As a result of the folding processes, inflator 62 is advantageously oriented relative to the folded portions to provide for rapid inflation of airbag 10 during a deployment process.

III. Dimensions of Certain Folded Portions of Airbag

Figure 10:
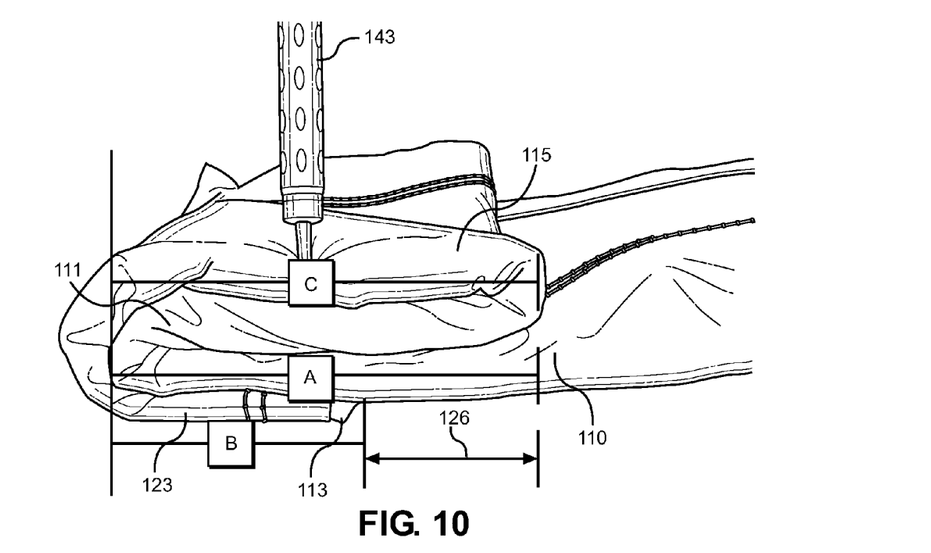
FIG. 10 is an enlarged perspective view of the portion of the airbag shown in FIG. 8 illustrating dimensions of certain folded portions.

FIG. 10 illustrates a more detailed view of a portion of airbag 10 in a pre-deployed state similar to bag 10 in FIG. 9. Relative dimensions of folded portions 111, 115, and 123 are identified as dimensions A, C, and B, respectively. In the exemplary embodiment shown in FIG. 10, a fold width A of first folded portion 111 and a fold width B of second folded portion 115 should be the same, substantially the same, or similar widths. Fold widths A, C of first and second folded portions 111 and 115 should correspond to a width between fold lines 102 and 118 (see FIG. 6).

Third folded portion 123 can have a fold width B that is a relatively smaller fold width than fold widths A and C of first and second folded portions 111 and 115. In the exemplary embodiment, folded edge 113 of third folded portion 123 is offset at distance 126 from fold line 118. The distance value of offset 126 can include any appropriate distance that is beneficial to early deployment of airbag 10 in a lateral direction.

Dimensions of fold widths A, B, and C can vary according to alternative configurations of airbags and requirements for lateral deployment. In fact, the embodiments are intended to include or otherwise cover any shape, dimension, or structure of folded portions 111, 115 and 123 of an airbag that could be configured for an early lateral deployment.

For purposes of the description and as a point of reference during inflation, holding pin 143 is secured against second folded portion 115 during deployment.

IV. Potential Directional Flow Paths of Inflation Gas

Figure 11:
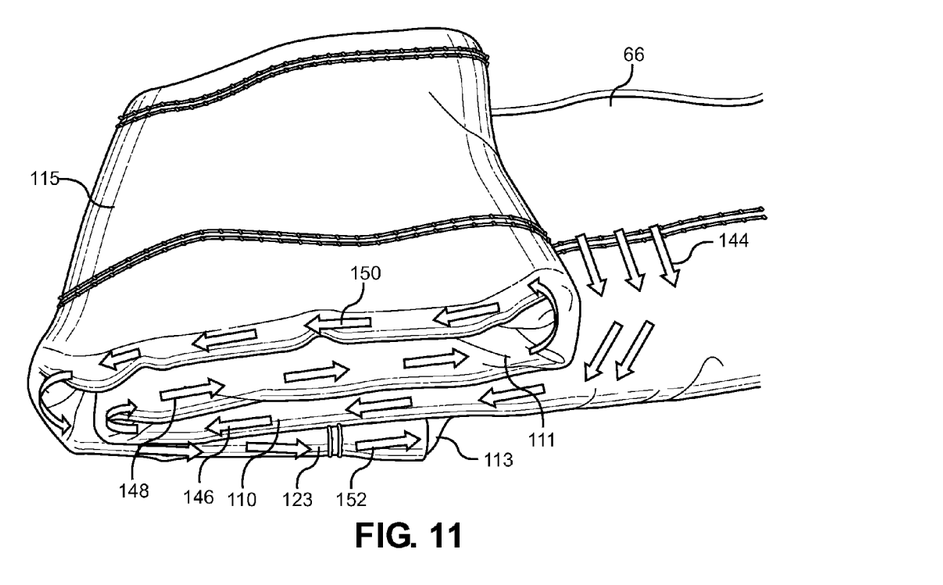
FIG. 11 is a perspective view of the airbag of FIG. 10 illustrating inflation fluid flow paths into certain folded portions.

FIG. 11 illustrates a portion of airbag 10 in FIG. 10 with potential directional flow paths of inflation gas within folded portions 110, 111, 115, and 123.

In the exemplary embodiment, direction arrows 144 can indicate directional flow paths of inflation gas flowing from inflator 62 during a deployment of airbag 10. Additionally, direction arrows 146 can indicate directional flow paths of inflation gas flowing from third portion 104 to flat rolled third portion 110. Further, direction arrows 148 can indicate directional flow paths of inflation gas flowing from flat rolled third portion 110 to first folded portion 111. Also, direction arrows 150 can indicate directional flow paths of inflation gas flowing from first folded portion 111 through second folded portion 115. In other embodiments, direction arrows 152 can indicate directional flow paths of inflation gas flowing from second folded portion 115 through third folded portion 123.

However, other embodiments are intended to include or otherwise cover any shape, dimension, or structure of flow paths indicated by direction arrows 144, 146, 148, 150, and 152 that could be configured for airbag 10.

V. Airbag Deployment

FIGS. 12-16 illustrate various steps for deployment of airbag 10 in accordance with some exemplary embodiments. The deployment process displaces airbag 10 from a pre-deployed configuration in FIG. 10 to a partially deployed configuration in FIG. 16. Deployment manipulates airbag 10 in a series of unfolding and expanding steps shown in FIGS. 12 to 16. In the figures, certain portions of airbag housing assembly 12 and airbag 10 are not shown for clarity.

Figure 12:
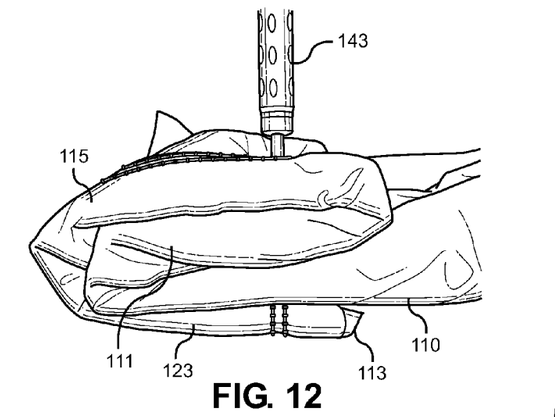
FIG. 12 is a perspective view illustrating a first step of airbag deployment.

FIG. 12 is a partial perspective view of a first step of airbag 10 deployment after activation of inflator 62. At initial deployment, inflator 62 is activated and releases inflation gas into airbag 10. In the exemplary embodiment, inflation gas from airbag 10 enters third portion 104 at least partially through inflation gas flow paths indicated by direction arrows 144. In the exemplary embodiment, inflation gas passes through third portion 104 and enters flat rolled third portion 110 via gas flow paths indicated by direction arrows 146 (see FIG. 11).

Figure 13:
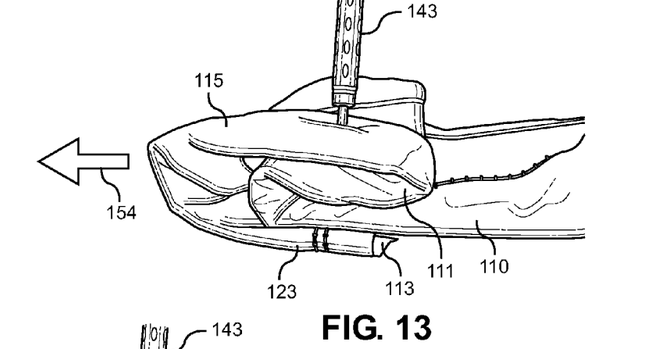
FIG. 13 is a perspective view illustrating a subsequent step of airbag deployment where a flat rolled portion initiates expansion of folded portions.

FIG. 13 is a partial perspective view of a second step of airbag 10 deployment where expansion of flat rolled third portion 110 initiates. Expansion of flat rolled third portion 110 can initiate displacement of first and second folded portions 111, 115 that overlie flat rolled third portion 110. More specifically, as flat rolled third portion 110 fills with inflation gas and expands, flat rolled third portion 110 can apply physical forces upon serpentine-folded first folded portion. In turn, displacement of first folded portion 111 can apply physical forces against second folded portion 115. First folded portion 111 cooperates with second folded portion 115 to cause a lateral displacement of second folded portion 115 away from airbag 10. Displacement can occur between a first position shown in FIG. 12 to a second position shown in FIG. 13.

Figure 14:
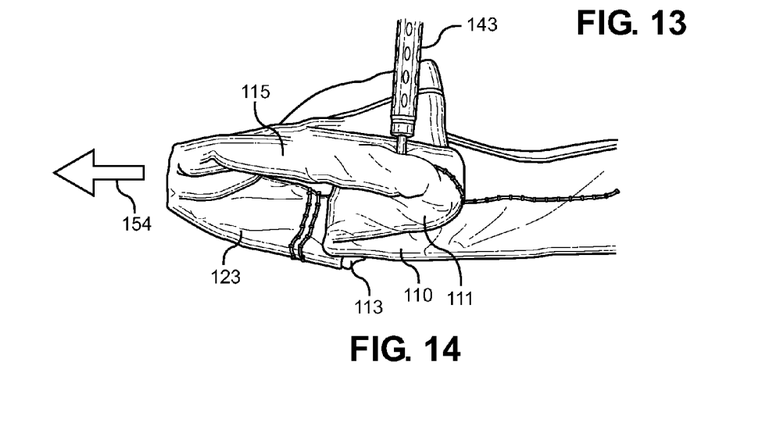
FIG. 14 is a perspective view illustrating a subsequent step of airbag deployment where folded portions expand and move toward an unfolded condition.

FIG. 14 is a partial perspective view of a third step of airbag 10 deployment. In the exemplary embodiment, the process of airbag 10 deployment can include inflation gas flowing from flat rolled third portion 110 into first folded portion 111. Flow of inflation gas occurs via gas flow paths indicated by direction arrows 148. As inflation gas flows in first folded portion 111, pressure increases in first folded portion 111 that can initiate an unfolding process of first folded portion 111. The unfolding process of first folded portion 111 can initiate displacement of first folded portion 111 in a lateral direction as indicated by direction arrow 154.

As first folded portion 111 fills with inflation gas, the inflation gas can flow from first folded portion 111 to second folded portion 115 via gas flow paths indicated by direction arrows 150. Due to the serpentine configuration of folded portions, second folded portion 115 can move with first folded portion 111 in a lateral direction.

When second folded portion 115 fills with inflation gas, pressure in the second folded portion 115 increases and can initiate an unfolding process of second folded portion 115. Initiation of the unfolding process of second folded portion 115 can affect displacement of third folded portion 123. As second folded portion 115 inflates, it expands in the lateral direction indicated by arrow 154. Second folded portion 115 cooperates with third folded portion 123 to displace in a direction away from airbag 10 in a lateral direction indicated by direction arrow 154.

Lateral displacement of third folded portion 123 can be indicated by the displacement of folded edge 113 from a first position in FIG. 13 to a second position in FIG. 14. More specifically, the first position of third folded portion 123 can be indicated from a first location of folded edge 113 in FIG. 13 in a pre-deployment state at or near an offset distance 126 from fold line 118. The second position of third folded portion 123 can be indicated from a second location of folded edge 113 at or near fold line 122 (see FIG. 7).

Figure 15:
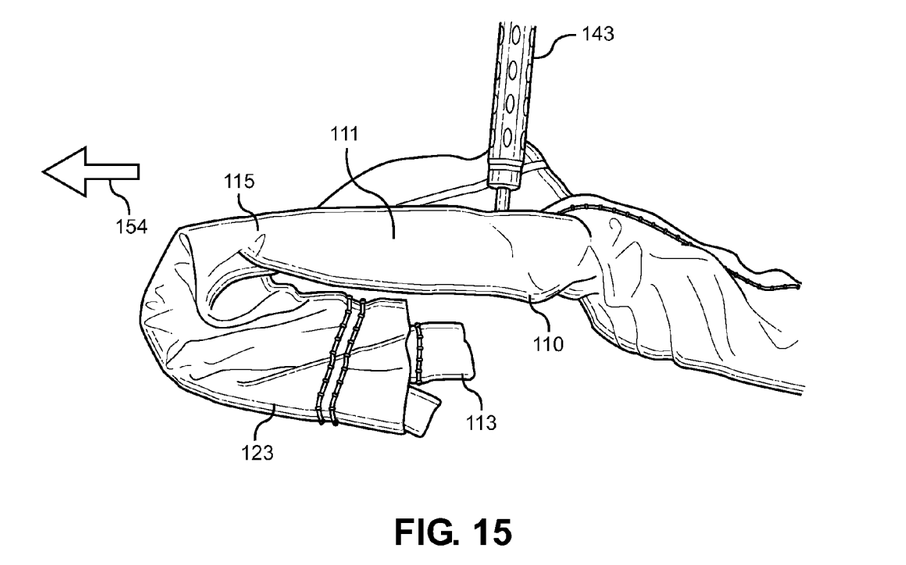
FIG. 15 is a perspective view illustrating a subsequent step of airbag deployment where folded portions continue to laterally expand.

FIG. 15 is a partial perspective view of a fourth step of airbag 10 deployment. In the deployment stage of FIG. 15, first and second folded portions 111 and 115 can unfold in the lateral direction of direction arrow 154 from the prior serpentine configuration that was configured in cooperation with flat rolled third portion 110. As inflation gas continues flowing into first folded portion 111, pressure increases in first folded portion 111. The increase in pressure can force an unfolding event of first folded portion 111 toward completion. In the exemplary embodiment, first folded portion 111 can laterally displace from a folded configuration, which was partially folded back onto flat rolled third portion 110, to an unfolded configuration. The unfolded configuration of first folded portion 111 can be contiguous to flat rolled third portion 110.

As inflation gas continues to flow into second folded portion 115, pressure increases in second folded portion 115. The increase in pressure can force an unfolding event of second folded portion 115. While unfolding, second folded portion 115 moves laterally away from its original folded orientation to an unfolded orientation that is contiguous to the unfolded orientation of first folded portion 111.

In the deployment process shown in FIG. 15, the inflation, unfolding, and subsequent lateral movement of first and second folded portions 111 and 115 applies tensile forces to third folded portion 123. The tensile forces cause third folded portion 123 to be disposed further away from airbag 10 in a lateral direction, indicated by direction arrow 154.

The deployment steps continue when the pressurized inflation gas inside first and second folded portions 111 and 115 applies pressure into third folded portion 123 along fold line 122. In the exemplary embodiment, inflation gas continues to flow into third folded portion 123 through flow paths indicated by direction arrows 152. Flow processes continue to add pressure in third folded portion 123. The added pressure initiates an unfolding process in third folded portion 123.

Figure 16:
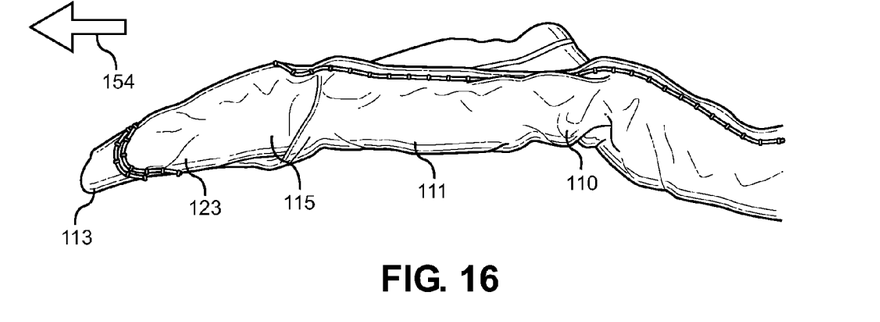
FIG. 16 is a perspective view illustrating a subsequent step of airbag deployment where folded portions approach the limit of lateral expansion.

FIG. 16 is a partial perspective view of a fifth step of airbag 10 deployment. In some of the embodiments, the inflation, unfolding, and subsequent lateral movement of first and second folded portions 111 and 115 continue to inflate and to apply tensile forces to third folded portion 123. Further, third folded portion 123 continues to inflate, thereby tending to expand. The tensile forces combined with internal inflation pressures cause third folded portion 123 to further displace. Third folded portion 123 displaces until it unwraps from the wrapped configuration under flat rolled third portion 110.

In some exemplary embodiments, inflation gas continues to flow into third folded portion 123 through flow paths indicated by direction arrows 152. Flow processes continue to add pressure in third folded portion 123 to expand laterally in the direction of arrow 154. The continuing inflation gas pressure eventually completes an unfolding process of third side portion 123. Third folded portion 123 unfolds into a configuration that is in the lateral direction of direction arrow 154. Third folded portion 123 cooperates with first and second folded portions 111 and 115 to deploy airbag 10 defined by a third configuration. In the deployed configuration, the various folded portions of the embodiments are unfolded, and a configuration of airbag 10 displaces back to the configuration of flat rolled portion 96. A lateral deployment occurs prior to any substantial unrolling or unfolding of airbag 10 in a vehicle forward or vehicle rearward direction.

In the third configuration, the laterally-deployed airbag 10 is intended to unfold and deploy past the legs of an occupant in seat 20. By deploying in the lateral direction early, the airbag 10 can unroll flat rolled portion 96 in the vehicle-rearward direction simultaneously upon both of occupant's legs. This promotes rapid inflation of vehicle rearward portion 26 in an even manner towards an occupant's legs.

In other words, the disclosed airbag 10 configuration enables the airbag 10 to first expand laterally to cover or substantially cover the lateral width of the area occupied by the passenger that the airbag 10 is intended to protect. Once the airbag expands laterally to cover or substantially cover this lateral width, the airbag 10 then expands toward the passenger to provide the requisite restraint and thereby buffer the passenger from other objects to enhance passenger safety. The airbag is thereby able to provide enhanced protection, even for a portion of the passenger's body that is not disposed immediately proximate the passenger's seat, based on the airbag's initial lateral deployment that covers or substantially covers the lateral width of the area occupied by the passenger.

VI. Alternative Embodiments

While certain embodiments of the invention are described above, and FIGS. 1-16 disclose the best mode for practicing the various inventive aspects, it should be understood that the invention can be embodied and configured in many different ways without departing from the spirit and scope of the invention.

For example, embodiments are disclosed above in the context of a vehicular airbag housing assembly that is disposed between a passenger seat and an instrument panel. However, the disclosed airbag housing assemblies can be disposed at any location within a vehicle that is beneficial to provide occupant knee airbags that promote occupant safety. In fact, the disclosed airbags, airbag assemblies, etc., can be configured to protect aspects of the passenger's body other than the knees, legs, etc. Any and all of the elements the airbag housing assemblies can be formed in any shape and size to accommodate different locations within the vehicle, such as on a driver's side of a vehicle, on a front passenger side of a vehicle, and on a rear passenger side of a vehicle.

The airbag housing assemblies disclosed above include a set of elements attached on an airbag (such inflators and tethers) that are disposed within a housing container. However, embodiments are intended to cover airbag housing assemblies that do not include inflators and tethers attached to an airbag. For example, alternative devices could cooperate with an airbag to perform the functions of the attached elements.

Certain methods of folding and unfolding airbag portions are disclosed above in the context of preparing an airbag for deployment and deploying an airbag in the event of a vehicular collision. However, embodiments are intended to include alternative folding methods that can place a portion of an airbag into a configuration having serpentine folded portions with a portion folded around the serpentine folded portions in a wrapping configuration. In other words, embodiments are intended to include alternative methods that can place an airbag in a folded configuration as described above, and upon deployment into a configuration causing an early lateral deployment of the airbag.

In the above embodiments, a unitary airbag is described in context of the airbag housing assemblies. However, embodiments are intended to include two or more airbags cooperating together.

Exemplary embodiments are intended to include or otherwise cover any appropriate type of materials of construction appropriate for elements of the airbag housing assemblies disclosed above.

Exemplary embodiments are also intended to cover any additional or alternative elements of the airbag housing assemblies disclosed above. Exemplary embodiments are further intended to cover omission of any elements of the airbag housing assemblies disclosed above.

Embodiments are disclosed above in the context of manual folding steps of airbags. However, embodiments are intended to cover methods and apparatus for automatically folding airbags including mechanisms that use or otherwise include motors, processors, software, etc.

Embodiments are disclosed above in the context of unfolding steps of airbags in a lateral direction. However, embodiments are intended to cover unfolding steps of airbags in any direction, such as a non-lateral direction, that use or otherwise include methods and devices of the disclosed embodiments.

Exemplary embodiments are intended to cover automatic initiation of deployment of an airbag housing assembly by an ECU, processors, or other vehicular computing devices. Embodiments are also intended to cover other methods of deployment, such as initiating deployment from a device external to a vehicle.

Embodiments are also intended to include or otherwise cover methods of manufacturing the airbag housing assemblies disclosed above. The methods of manufacturing include or otherwise cover processors and computer programs implemented by processors used to design various elements of the airbag housing assemblies disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations of airbag housing assemblies disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An airbag for use with an inflator that is configured to fill the airbag with fluid, the airbag also for use with a vehicle that includes a passenger seat, an instrument panel, and a longitudinal axis, the airbag comprising:
    a first portion disposed closest to the passenger seat upon deployment and configured to be rolled to form a cylindrical configuration having an axis that is perpendicular to the longitudinal axis of the vehicle, the first portion including a serpentine section that is disposed closest the longitudinal axis of the vehicle and configured to be folded in a serpentine manner along the axis of the cylindrical configuration, the first portion also including a rolled section that is spaced further from the longitudinal axis of the vehicle than the serpentine section; and
    a second portion disposed closer to the instrument panel than the first portion and including a tether that is rigidly connected to the vehicle, the second portion being disposed further from the longitudinal axis of the vehicle than the serpentine section, but being disposed at approximately the same distance from the longitudinal axis of the vehicle as the rolled section.

2. The airbag of claim 1, wherein the serpentine section includes a tip end that is configured to fold away from the longitudinal axis of the vehicle and below a remaining portion of the serpentine section to thereby form a bottom thereof.

3. The airbag of claim 1, wherein the rolled section includes a tip end that is configured to fold toward the longitudinal axis of the vehicle and above a remaining portion of the rolled section.

4. The airbag of claim 1, wherein the first portion is disposed and oriented relative to the inflator, such that the fluid initially flows from the inflator into the second portion in a direction parallel to the axis of the cylindrical configuration.

5. The airbag of claim 4, wherein the second portion includes a wall that directs the fluid provided by the inflator from the second portion into the serpentine section.

6. The airbag of claim 5, wherein the serpentine section is oriented and disposed so as to initially expand toward the longitudinal axis of the vehicle upon being supplied with the fluid.

7. The airbag of claim 6, wherein the first and second portions are oriented and disposed such that the first portion expands toward the passenger seat once the first portion is fully extended in a direction perpendicular to the longitudinal axis of the vehicle.

8. The airbag of claim 1, wherein the second portion includes holes for communication with bolts to secure the second portion to the vehicle.

9. The airbag of claim 1, wherein the serpentine section includes multiple folded portions of approximately equal length.

10. The airbag of claim 9, wherein the serpentine section includes a tip end that is configured to fold away from the longitudinal axis of the vehicle and below a remaining portion of the serpentine section to thereby form a bottom thereof, the folded tip end being shorter than each of the multiple folded portions.

11. An airbag assembly for use with a vehicle that includes a passenger seat, an instrument panel, and a longitudinal axis, the airbag assembly comprising:
    an airbag that includes:
        a first portion disposed closest to the passenger seat upon deployment and configured to be rolled to form a cylindrical configuration having an axis that is perpendicular to the longitudinal axis of the vehicle, the first portion including a serpentine section that is disposed closest the longitudinal axis of the vehicle and configured to be folded in a serpentine manner along the axis of the cylindrical configuration, the first portion also including a rolled section that is spaced further from the longitudinal axis of the vehicle than the serpentine section; and
        a second portion disposed closer to the instrument panel than the first portion and including a tether that is rigidly connected to the vehicle, the second portion being disposed further from the longitudinal axis of the vehicle than the serpentine section, but being disposed at approximately the same distance from the longitudinal axis of the vehicle as the rolled section;
    an inflator that houses pressurized fluid, and is configured to fill the airbag with the pressurized fluid to deploy the airbag upon collision of the vehicle; and
    a housing that is configured to house the airbag in a rolled and folded condition while enabling deployment when the airbag is filled with the pressurized fluid.

12. The airbag assembly of claim 11, wherein the serpentine section includes a tip end that is configured to fold away from the longitudinal axis of the vehicle and below a remaining portion of the serpentine section to thereby form a bottom thereof.

13. The airbag assembly of claim 11, wherein the rolled section includes a tip end that is configured to fold toward the longitudinal axis of the vehicle and above a remaining portion of the rolled section.

14. The airbag assembly of claim 11, wherein the first portion is disposed and oriented relative to the inflator, such that the fluid initially flows from the inflator into the second portion in a direction parallel to the axis of the cylindrical configuration.

15. The airbag assembly of claim 14, wherein the second portion includes a wall that directs the fluid provided by the inflator from the second portion into the serpentine section.

16. The airbag assembly of claim 15, wherein the serpentine section is oriented and disposed so as to initially expand toward the longitudinal axis of the vehicle upon being supplied with the fluid.

17. The airbag assembly of claim 16, wherein the first and second portions are oriented and disposed such that the first portion expands toward the passenger seat once the first portion is fully extended in a direction perpendicular to the longitudinal axis of the vehicle.

18. The airbag assembly of claim 11, wherein the second portion includes holes for communication with bolts to secure the second portion to the vehicle.

19. The airbag assembly of claim 11, wherein the serpentine section includes multiple folded portions of approximately equal length, and a tip end that is configured to fold away from the longitudinal axis of the vehicle and below a remaining portion of the serpentine section to thereby form a bottom thereof, the folded tip end being shorter than each of the multiple folded portions.

20. A method of orienting an airbag for disposition within a housing, the airbag being configured for use with an inflator that is able to fill the airbag with fluid, the airbag also being configured for use with a vehicle that includes a passenger seat, an instrument panel, and a longitudinal axis, the method comprising:

rolling a first portion of the airbag, which is disposed closest to the passenger seat upon deployment, so as to form a cylindrical configuration having an axis that is perpendicular to the longitudinal axis of the vehicle;

folding a serpentine section of the first portion, which is disposed closest the longitudinal axis of the vehicle, in a serpentine manner along the axis of the cylindrical configuration;

disposing a rolled section of the first portion so as to be spaced further from the longitudinal axis of the vehicle than the serpentine section;

disposing a second portion of the airbag so as to be: closer to the instrument panel than the first portion, further from the longitudinal axis of the vehicle than the serpentine section, and at approximately the same distance from the longitudinal axis of the vehicle as the rolled section; and rigidly attaching a tether of the second portion the vehicle.

\* \* \* \* \*